United States Patent Office 3,377,262
Patented Apr. 9, 1968

3,377,262
PROCESS OF IMPROVING THE PRINTABILITY OF A POLYESTER DRAFTING FILM USING AN ELECTRIC DISCHARGE AND HEAT
Michael Karickhoff and Jerry Claud Lofland, Circleville, Ohio, assignors to E. I. du Pont de Nemours and Company, Wilmington, Del., a corporation of Delaware
No Drawing. Filed Mar. 2, 1965, Ser. No. 436,658
3 Claims. (Cl. 204—165)

This invention relates to post-treatment of filled, synthetic, organic polymer shaped articles and more particuarly to drafting films and processes for their treatment to affect the definition of applied ink markings on the surface.

Films of polyethylene terephthalate or polypropylene containing opacifying and toothing agents such as finely divided silica, which are employed as drafting films, have the proper balance of opacity and translucence and a mat surface to make the film ideal as a drafting film for use with pencil; however, these filled films are not suitable for ink drafting due to the poor adhesion of the ink. While conventional electrical discharge treatment produces an adherent base for drafting inks, the inked markings tend to feather or spread thereby destroying the precision of definition and resolution essential to engineering drawings, resulting in the inability to resolve fine details and presenting poor appearance.

At first instance, it appears that residual electrical charges on the film as a consequence of the electrical discharge treatment is responsible in some manner for this undesirable behavior of the inks. However, treatment of the film with standard methods for removal of static charges, such as with electrically driven and radioactive types of apparatus, does not reduce the feathering effect.

It is therefore, an object of the present invention to provide for the adhesion of ink marks applied to filled, synthetic, organic polymer shaped articles and for the sharp definition of such applied marks.

It is a further object of the present invention, to provide for the reduction of spreading of inks in marking filled, synthetic organic polymer films.

It is a still further object of the present invention to provide drafting films and processes for their treatment to affect the definition of applied ink markings on the surface. These and other objects will appear hereinafter.

These and other objects of the invention are accomplished by the process of exposing a filled, synthetic, organic polymer shaped article to an electrical discharge treatment and subsequently heating the treated article to a temperature of at least 200° F., preferably a temperature within the range of 200° F. to 400° F.

A revealing indication of the efficacy of electrical discharge treatment and the need for uniformity of treatment in filled films used for drafting is the character of ink lines marked with a pen. Non-uniform electrical discharge treatment, such as incidental to intermittent quenching of the discharge, or other causes, will cause irregular width in pen lines, resulting in poor appearance of the finished drawing. In extreme cases, ink will not adhere. Therefore, it is seen that care is essential in selection and application of the electrical discharge procedure. The treatment does, however, cause feathering or irregular spreading of ink, which generally cannot be tolerated, especially in drafting films. The process of this invention thus is coupled to the cause of feathering, namely, electrical discharge treatment.

Hollow electrodes may be employed in the electrical discharge process if a gaseous atmosphere other than air is needed to benefit the treatment of a particular film, the gaseous atmosphere consisting of the vapor of an organic compound as the active agent is, either alone or admixed with a suitable carrier gas such as nitrogen or carbon dioxide, fed continuously to the hollow electrode tubes and issues through suitable openings in the tubes at the gap between the tubes and the roll. Air is, however, generally sufficient and is preferred. When vapors are used, the electrical discharge assembly is enclosed in a chamber which is provided with openings to facilitate maintenance of the gaseous atmosphere therein and to permit controlled exhaust of the vapors therefrom to minimize operational hazards.

In carrying out the electrical discharge treatment of the film surface, the techniques known to those skilled in the art are to be applied. Generally, this consists in passing a continuous self-supporting film between a set of spaced electrodes consisting of a rotating metal roll, preferably covered with a thin dielectric, which is electrically connected to ground, and one or more stationary metal bars disposed transverse to the longitudinal axis of the roll and spaced a distance to form a gap of from 0.03 to 0.125 of an inch from the surface of the roll. The bars, constituting the one electrode, and the metal roll, the other, are electrically connected to a suitable power source having one side grounded, which supplies an alternating (or pulsating direct) current of the required voltage to maintain an electrical discharge in the gap. The preferable source of high voltage may be of the Tesla-coil type, or a high frequency sine wave alternator driven by a motor and provided with a transformer to step up the voltage to the necessary level. The potential difference between the electrodes may vary from low voltages in the order of 1000 volts up to voltages of 100,000 and above. In general, however, it is preferred to maintain the voltage in excess of 2000 to 3000 volts. Frequencies from 350 cycles per second up to 500,000 cycles per second and above can be used. Frequencies in the range of 3,000 to 10,000 cycles supplied as a sine wave are preferred in order to obtain effective treatment at commercially acceptable exposure times. While the current to the electrodes may range up to 5.5 RMS (root mean square) amperes or more, for optimum results a range of from 0.3 RMS ampere to 3.5 RMS amperes is preferred. Power to the electrodes may range from 10 watts per lineal inch of the electrode length to 100 watts per lineal inch of electrode length. The electrical discharge employed has an energy level below 15 electron volts, and is not to be confused with high or intermediate energy irradiations used in the treatment of polymeric surfaces.

The electrode gap is preferably from about 0.03 inch to about 0.125 inch. Useful results can be obtained, however, when the electrode gap is as low as 0.015 inch to as much as 0.25 inch provided suitable adjustments are made in such features as amount of voltage, electrode dimension and exposure time. Time of exposure to the electrical discharge treatment is not especially critical and effective treatments under some conditions are realized at exposure times as short as $1 \times 10^{-5}$ second and no adverse effects are noted at times as long as 60 seconds. Preferably, the exposure time should not be less than $4 \times 10^{-4}$ second. For economic reasons, exposure times as short as possible consistent with effective treatment would normally be employed.

The treatment of this invention can be effectively applied to essentially any filled, polymeric shaped structure, preferably a film, which can receive electrical discharge treatment for the improvement of ink adhesion and by such treatment has a surface characteristic which causes feathering of ink marks when applied thereon. As representative filled polymeric shaped structures, there can be mentioned filled shaped structures from perfluorocarbon polymers, vinyl fluoride polymers, vinylidene fluoride polymers, vinyl chloride polymers, vinylidene chloride polymers, vinyl acetate polymers, polyolefins such as polyethylene, polypropylene and polybutene-1, polystyrene, linear polyesters, such as polyethylene terephthalate, polyamides, acrylonitrile polymers, acrylate and methacrylate polymers, polyurethanes, polycarbonates, regenerated cellulose, cellulose acetate, cellulose ethers, polyacetals, polyspiroacetals such as those derivable from pentaerythritol and dialdehydes, coumarone-indene resins, epoxy resins, phenolaldehyde resins, urea-formaldehyde resins, melamine-formaldehyde resins, isocyanate resins, protein resins, etc. Also, filled coatings of such polymers on a base sheet or film are within the scope of the present invention.

Fillers are generally hard, inorganic particles which are known to the art for imparting one or more particular properties to the film. For example, they are used to impart opacity, or to provide a toothing surface especially important for pencil receptivity, as coloring agents, or as reinforcing agents. Such fillers include not only the natural and synthetic silicas preferred for drafting film, but also aluminas, barium sulfate, calcium carbonate, titanium dioxide, clays, mica, etc. Darker filler and pigmenting agents such as carbon black and pigmenting metal oxides having a dark hue for marking with white or light colored inks are also operable fillers. A particular filler may not impart all of the above properties; it is selected on the basis of the intended function. For example, a toothing agent may have a refractive index near that of the polymer and thus not appreciably alter the transparency of the film, and yet impart sufficient roughness to the surface to provide pencil take. Conversely, some films may be highly opaque, but by virtue of particular manufacturing methods has a smooth surface. The critical feature is that the filled film apparently possesses a particular electrical characteristic, which upon impingment of the electrical discharge results in a surface and subsurface modification which causes the ink to flow irregularly on the surface and feather. The particle size is not especially critical so far as the utility of the present invention is concerned, but in its preferred use, the improvement of ink receptivity of drafting films, the particle size is of an average size of 1 to 10 microns, preferably 4 to 6 microns. These particles are usually present in drafting films in a polymeric structure in a weight concentration of 0.5% to 25% filler, preferably 2.5 to 10%.

In the present invention it is found that the effect of feathering of ink in drafting films is produced by the electrical discharge treatment to improve adhesion of printing inks and is reduced by heating the treated surface immediately after discharge treatment, before further handling or use. It is found that radiant heat is effective, and for consistent results the film surface should be heated to an approximate temperature of 200° F. or above, but preferably not more than approximately 400° F. The upper temperature is a practical limitation determined by the effect on other properties of the film; attempts to heat some films to temperatures in excess of 400° F. have deleterious effects on the mechanical properties of the film.

Further, it is found that if the film is wound on a roll after electrical discharge treatment and later unwound and the electrical discharge treated surface heated, the treatment is only randomly effective in reducing feathering. Thus, to be assured that the heat treatment will reduce feathering, it should be in line with electrical discharge treatment, that is, follow the electrical discharge treatment prior to other operations with the film.

The invention can be further understood by referring to the following examples:

Example 1

To serve as controls, samples of filled polyethylene terephthalate film .0015 inch in thickness containing 5% by weight of silica having an average particle size in the range of 4 to 6 microns, biaxially stretched 2.4–3.0× and heat set at 190° C., are exposed to a gaseous electrical discharge across a bar electrode ½ inch in width forming a narrow gap between the bar and the film as the film passes over and in contact with a grounded roller. The grounded roller has a thin silicone dielectric coating, which, as is known to the art, restricts the gaseous electrical discharge to gap between the film and the electrode and prevents treatment of the reverse side of the film. Apparatus for treatment employs a motor driven alternator, with the necessary step-up transformer and accessory equipment, as is known to the art for treatment of film with an electrical discharge to improve printability. Electrical discharge conditions were varied to determine the effect on ink feathering or spreading.

Table I shows the electrical discharge conditions employed, ink adhesion and ink receptivity.

TABLE I

| Sample | Film Speed (f.p.m.) | Air Gap (mils) | Power (watts/in.) | Freq. (kc.) | Electrode Potent. (volts) | RMS (amp.) | Drum T (° F.) | Ink Adhesion | Ink Receptivity |
|---|---|---|---|---|---|---|---|---|---|
| 1 | 150 | 30 | 20 | 10 | 3,850 | ---- | 77 | Good | Feathers. |
| 2 | 150 | 40 | 20 | 10 | 4,250 | 0.36 | 77 | do | Do. |
| 3 | 150 | 40 | 30 | 10 | 4,500 | 0.42 | 77 | do | Do. |
| 4 | 150 | 40 | 40 | 10 | 4,800 | 0.50 | 77 | do | Do. |
| 5 | 150 | 40 | 30 | 15 | 4,300 | 0.57 | 77 | do | Do. |
| 6 | 150 | 40 | 20 | 10 | 4,500 | 0.35 | 77 | do | Do. |
| 7 | 10 | 50 | 30 | 5 | 3,200 | 0.10 | 77 | do | Do. |
| 8 | 100 | 40 | 20 | ¹10 | 3,700 | 0.28 | 77 | do | Do. |

¹ In N/₂

As can be seen from Table I, varying the electrical discharge condition does not improve ink feathering.

Samples of the same filled film as above are passed at a rate of 10 f.p.m. through an electrical discharge treatment comprising a frequency of 5 kc., an air gap of 40 mils, a power level of 30, an electrode potential of 3200 volts, a current of 0.1 r.m.s. amp. and a drum temperature of 77° F. Samples are subjected to various heat treatments prior to and after electrical discharge treatment is effected. Pre-heating and post-heating are accomplished by two electric radiant heaters rated at 800 watts each and spaced 4 inches from the web and immediately before and immediately after the discharge, respectively. Heating during the discharge was accomplished by heating the grounded roll which forms part of the electrical circuit in the discharge treatment.

Table II shows the heating conditions, ink adhesion and ink receptivity.

TABLE II

| Sample | Heating | Ink Adhesion | Ink Receptivity |
|---|---|---|---|
| 9 | None | Good | Feathers. |
| 10 | Pre-heat 200° F. (radiant) | do | Do. |
| 11 | Hot roll 230° F. during discharge | do | Do. |
| 12 | Post-heat 125° F. (raidant) | do | Do. |
| 13 | Post-heat 175° F. (radiant) | do | Do. |
| 14 | Post-heat 200° F. (radiant) | do | Sharp definition. |
| 15 | Post-heat 225° F. (radiant) | do | Do. |
| 16 | Post-heat 275° F. (radiant) | do | Do. |

As can be seen from Table II, it is only when the film is heated to at least 200° F. after the film has been treated by an electrical discharge that ink markings do not feather.

EXAMPLE 2

A mill roll of filled polyethylene terephthalate film as in Example 1, Sample 7, is electrically discharge treated as indicated for that sample and is rewound immediately after treatment. Samples from this roll upon being unwound are found to feather badly when written upon with drafting ink. Heating these samples to a temperature of 200 to 230° F. resulted in only slight reduction in most samples.

A mill roll is post-heated as in Example 1, Sample 14, and rewound immediately after treating. All samples taken from this roll on unwinding show good adhesion to drafting ink, and no feathering.

Film treated according to the present invention provides an ink-receptive organic film drafting base of a quality which cannot be achieved by any other known method. Electrical discharge is essential for ink adhesion, but such film is unsuitable for precision uses such as for drafting as a result of uncontrolled spreading, or feathering of inks. The present invention provides a simple, economical method to avoid this quality impairing condition.

What is claimed is:

1. The process comprising: exposing at least one surface of a linear polyester article containing an inorganic particulate material to the action of an electrical discharge between positive and negative electrodes, whereby said surface is rendered adherable to marking materials; and subsequently heating said surface to a temperature within the range of 200° F. to 400° F., whereby the spreading of applied materials is reduced.

2. The process of claim 1 wherein the synthetic organic polymer film is polyethylene terephthalate film.

3. The process comprising: exposing at least one surface of a polyethylene terephthalate film containing 0.5% to 25% by weight of an inorganic particulate material to the action of an electrical discharge at substantially atmospheric pressure between spaced positive and negative electrodes maintained at a voltage differential in excess of about 1000 volts, said electrical discharge having an energy level below 15 electron volts, whereby said surface is rendered adherable to marking materials; and subsequently heating said surface to a temperature within the range of 200° to 400° F., whereby the spreading of applied marking materials is reduced.

References Cited

UNITED STATES PATENTS

| | | | |
|---|---|---|---|
| 2,859,481 | 11/1958 | Kaghan et al. | 204—168 |
| 3,061,882 | 11/1962 | Wolinski | 204—168 |
| 3,081,214 | 3/1963 | Strome | 204—165 |
| 3,245,896 | 4/1966 | James | 204—168 |

ROBERT K. MIHALEK *Primary Examiner.*